United States Patent [19]
Ritsema

[11] 3,719,841
[45] March 6, 1973

[54] WHEEL SPEED SENSORS FOR VEHICLE ADAPTIVE BRAKING SYSTEMS

[75] Inventor: Irving R. Ritsema, South Bend, Ind.

[73] Assignee: The Bendix Corporation, South Bend, Ind.

[22] Filed: July 2, 1971

[21] Appl. No.: 159,310

[52] U.S. Cl. .................. 310/155, 310/89, 310/168
[51] Int. Cl. .............................................. H02k 21/38
[58] Field of Search........310/67, 155, 181, 169, 168, 310/89; 336/135; 318/328; 74/752; 188/158, 159

[56] References Cited

UNITED STATES PATENTS

| | | | |
|---|---|---|---|
| 3,604,966 | 9/1971 | Liggett | 310/168 |
| 3,626,226 | 12/1971 | Pauwels | 310/168 |
| 3,626,227 | 12/1971 | Ritsema | 310/168 |
| 3,679,922 | 7/1972 | Rahn | 310/89 |
| 3,317,765 | 5/1967 | Cone | 310/155 X |
| 3,572,168 | 3/1971 | Shirai et al. | 74/752 |

Primary Examiner—D. F. Duggan
Attorney—Ken C. Decker et al.

[57] ABSTRACT

Wheel speed sensing means for adaptive braking systems on vehicles having rotating drive line elements supported by bearings in housings, comprising teeth on one of said rotating elements and mounting an electrical pickup device in an opening in the housing in proximity to said teeth.

2 Claims, 10 Drawing Figures

PATENTED MAR 6 1973

INVENTOR.
IRVING R. RITSEMA
BY
Ken C. Decker

WHEEL SPEED SENSORS FOR VEHICLE ADAPTIVE BRAKING SYSTEMS

SUMMARY OF THE INVENTION

The invention relates to adaptive braking systems for automotive vehicles of the general class illustrated in U.S. Pat. No. 3,494,671, having in common with this application the same assignee. The invention relates more specifically to means for sensing the rotating speed of individual wheels, or, in some cases, the average rotating speed of pairs of wheels on a common axle interconnected by differential gearing.

In early developments, wheel speed sensors have been provided in the form of integrated devices having housings and bearings requiring separate lubrication from that normally supplied on vehicles. Such devices have been gear driven and also driven by frictional contact with brake drums or with special elements attached to the vehicle wheels or axles in the vicinity of the brakes. Such devices are illustrated by U.S. application Ser. No. 42,402, filed June 1, 1970, now U.S. Pat. No. 3,629,635 having in common with this application the same assignee. These devices have been troubled by limited life of bearings and drive elements due to the requirements of high speed operation in an extremely dirty environment.

Other early developments involved providing toothed wheel elements attached to vehicle wheel hubs or axles in the vicinity, and sometimes within the wheel brakes, and placing pickups on fixed structures such as brake backing plates. Examples of these devices are shown in U.S. application Ser. No. 42,111, filed June 1, 1970, now U.S. Pat. No. 3,626,224 having in common with this application the same assignee. These devices were troublesome due to deflections of the axle and brake elements because they were installed at points where the very high vehicle ground contact forces were at a maximum.

Basic requirements for wheel speed sensors are absolute reliability, freedom from signal irregularities which are induced primarily by run out of the rotating elements and mounting deflections. These requirements must be combined with extremely low cost, if the systems are to receive public acceptance. Consequently, it is an object of this invention to provide wheel speed sensors at minimum cost while providing maximum reliability and freedom from environmental problems.

It is a further object to provide wheel speed sensors that are essentially free of run out or deflections that could cause signal variation or create spurious signals.

These and other objects are accomplished by using for the sensor existing rotating elements of the vehicle which are in themselves stiff and rugged and which are rigidly supported by massive bearings and strong housings. Teeth are provided on appropriately selected elements of the drive line and electrical pickups are mounted in openings in the housings. These mountings are made in a sealing relationship to prevent loss of lubricants or entrance of contaminants. The massiveness of these parts designed to insure the proper mesh and long life of drive line gears equally insures flawless operation of these sensors.

DETAILED DESCRIPTION OF THE INVENTION

Figure 1:
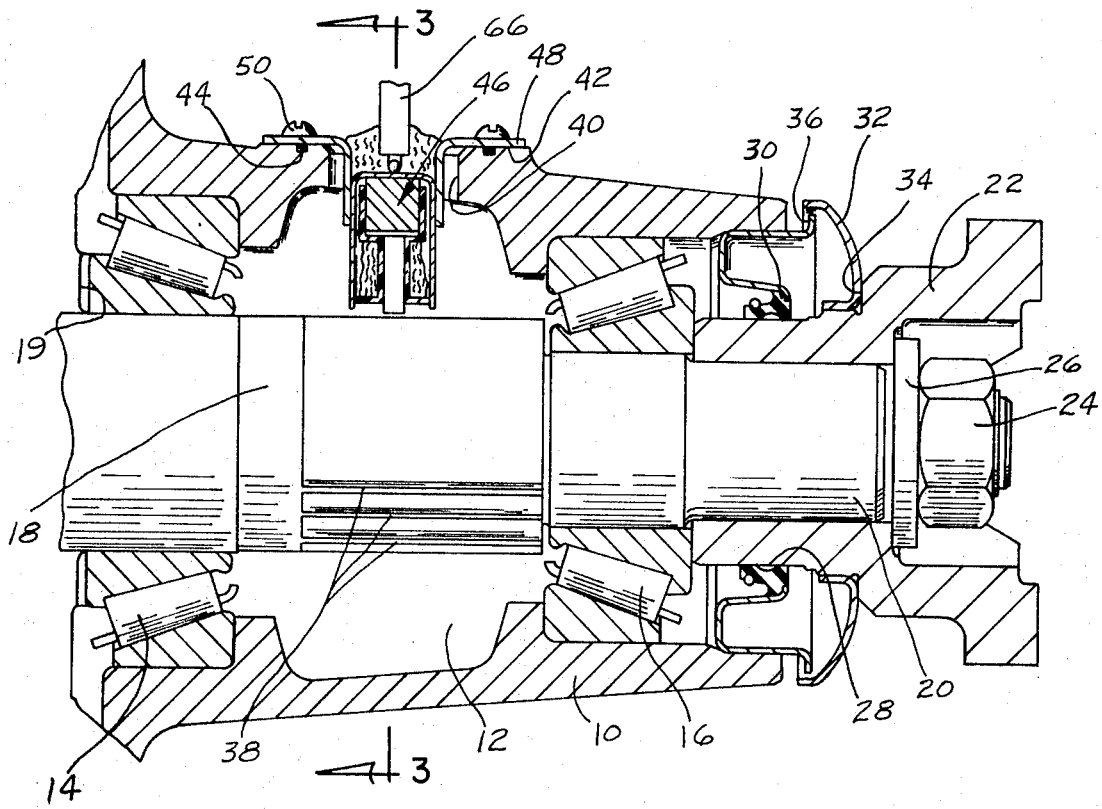
FIG. 1 is a partial sectional view in a horizontal plane of an automobile differential showing the wheel speed sensor of the invention.
Figure 3:
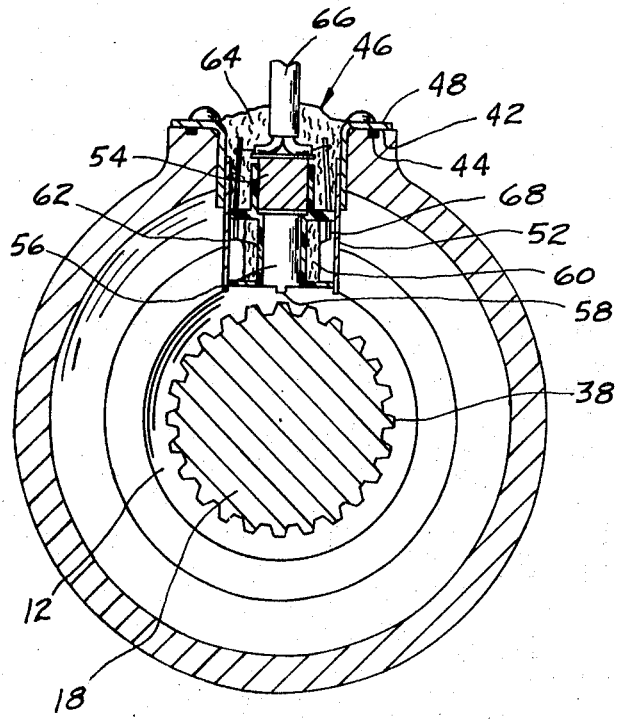
FIG. 3 is a cross-sectional view on the line 3—3 of FIG. 1.

Referring now to FIGS. 1 and 3 inclusive, there is shown parts of an automobile differential including a housing 10 having a bore 12 in which a pair of aligned tapered roller bearings 14 and 16 are mounted. A pinion gear shaft 18 is carried in these bearings and secured in the usual manner by having a shoulder 19 engaged with the bearing 14 and a splined end 20 on which a universal joint yoke 22 is mounted and secured with one end against the bearing 16 by a nut 24 and lock washer 26. A polished cylindrical surface 28 on the universal joint yoke 22 passes through a seal 30 mounted in the outer end of the bore 12. A slinger 32 is pressed against a shoulder 34 of the universal joint yoke 22 and surrounds a radial flange 36 of the seal 30 to prevent ingress of solid or liquid contaminants to the seal. The remainder of the differential is conventional and well known in the art, and therefore is not illustrated or described in detail.

In accordance with the invention, a portion of the shaft 18 intermediate the bearings 14 and 16 is formed with teeth 38 of a pitch and number to provide a suitable number of impulses per mile of vehicle motion. It should be understood that, because the differential gearing has a ratio of about three to one, the number of the teeth 38 may be approximately one-third the number that are required on an axle or wheel mounted sensor. The number of teeth 38 on the pinion gear shaft 18 may be varied as the differential gear ratio varies, thereby producing the same number of impulses per mile for all vehicles. This means that the electronic control units would not have to be altered with each rear axle ratio.

The housing 10 is formed with an opening 40 in the wall of the bore 12 opposite the toothed portion 38 of the shaft 18. The area adjacent this opening may be cast and machined as a rectangular boss having a flat mounting surface 42. An O-ring groove containing an O-ring 44 may be formed in this surface. An electromagnetic pickup device 46 is provided with a corresponding rectangular mounting flange 48 which is secured to the face 42 by means of four machine screws 50.

The pickup 46 may comprise a rectangular cup-shaped steel stamping or housing 52 which contains, from its bottom outwardly, the following components: a cylindrical permanent magnet 54, an iron pole piece 56 formed with a plurality of teeth 58 of the same pitch as the teeth 38, and a coil 60. The coil 60 is wound on a molded plastic spool 62 having sleeve elements which initially receive and position the magnet 54 and the pole piece 56. As described in one or more of the aforementioned patent applications, all of these components may be pre-positioned within the cup-shaped housing 52 and the mounting flange 48 and be permanently secured together by the injection of an encapsulating compound 64. By this means a very close dimension may be held between the mounting surface of the flange 48 and the teeth 58, whereby an air gap is established within predetermined limits when the pickup is secured to the mounting surface 42. It is possible to place the teeth 58 into suitable proximity to the teeth 38 without need for an adjustment. The use of the O-ring gasket 44 permits metal-to-metal contact between the mounting surface 42 and the mounting flange 48 so that no additional tolerance is introduced as would be the case if a paper or fiber gasket were used.

It should be understood that close matching tolerances are also required to locate the mounting surface 42 accurately with relation to the centerline of the bearings 14 and 16, and on the diameter of the toothed surface 38 of the shaft 18. This diameter must also be held closely concentric to the center line of the bearings to eliminate run out. The modern manufacturing techniques and equipment used in manufacturing these parts make it possible to hold the requisite close tolerances without appreciable increases in cost, thereby rendering the invention quite economical.

A suitable paired wire lead 66 is attached to terminals 68 of the coil 60 and serves to conduct the electrical impulses to the amplifying computer element (not shown) of the adaptive braking system as described in the aforementioned patent.

In operation, as the vehicle moves, the shaft 18 rotates and the teeth 38 are alternately aligned and not aligned with the teeth 58. When aligned, the permanent magnet establishes a high flux through the pole piece 56. When the teeth are not aligned, this flux is reduced materially. Since this flux links the coil 60, the changes in flux induce voltage in the coil which appears at the terminals as pulses, one for each tooth 38 that passes the teeth 58. The amplifier-computer is equipped with circuits which can determine the time-rate of frequency of these pulses. This frequency is easily converted into speed. A first derivative may be taken if it is desired to have a measure of wheel deceleration.

It should be clear that the many problems of run out, deflections, contamination and wear to which previous wheel speed sensors have been subject either do not exist in the devices of the invention or can be easily guarded against.

Figure 2:
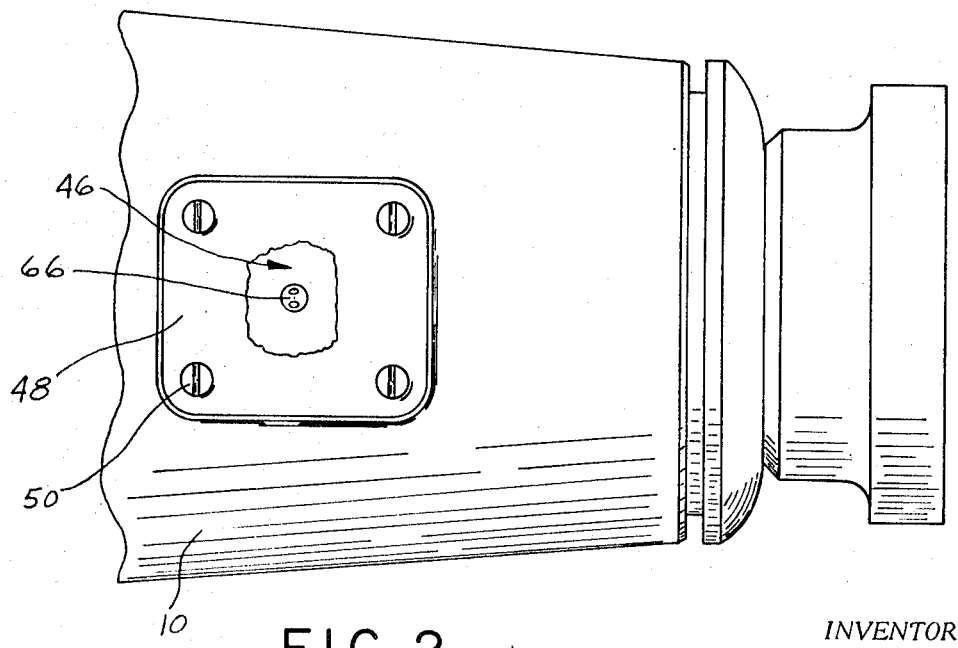
FIG. 2 is a top plan view of the differential of FIG. 1.
Figure 5:
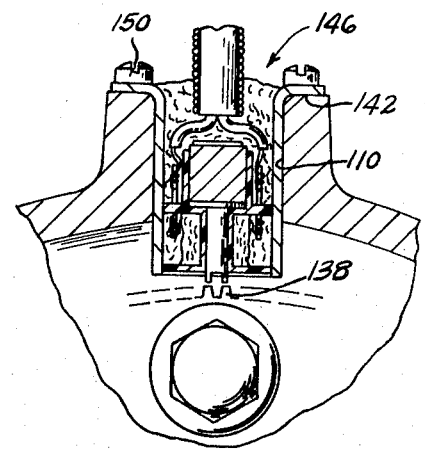
FIG. 5 is a transverse cross-sectional view on the line 5—5 of FIG. 4.
Figure 4:
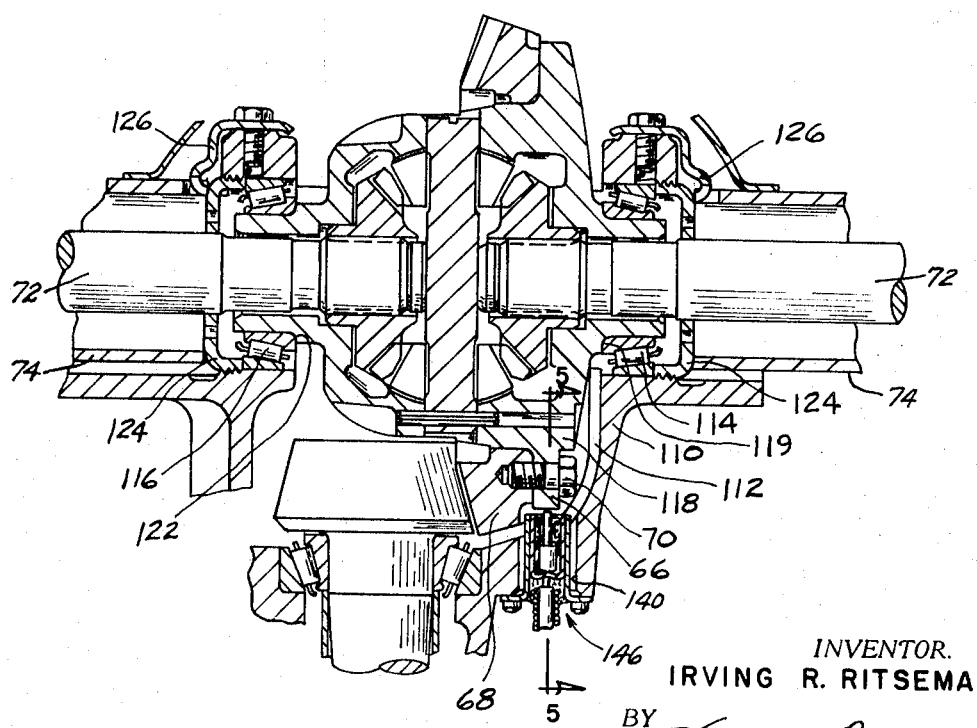
FIG. 4 is a partial sectional view in a horizontal plane of an automobile differential showing a second form of the invention.

In FIGS. 4 and 5, showing a second form of the invention, parts having similar functions to those in the embodiment of FIGS. 1-3 inclusive will be referred to by the same reference numerals plus 100. In this form, the differential housing 110 surrounds a gear chamber 112 in which a pair of aligned roller bearings 114 and 116 are mounted. A differential cage 118 is carried in these bearings and secured in the usual manner by having a shoulder 119 engaged with the bearing 114 and a shoulder 122 engaged with the bearing 116. The bearings, in turn, are secured in the housing 110 by a pair of nuts 124 and locking devices 126. The differential cage 118 is provided with a flange 66 to which is secured a bevel gear 68 by means of cap screws 70.

In accordance with the invention, the flange 66 is extended slightly beyond the gear 68 and formed with teeth 138 of a pitch and number to provide a suitable number of impulses per mile of vehicle motion. In this case, it should be noted that the angular velocity of the differential cage 118 will be equal to the average angular velocity of the vehicle's two rear wheels (not shown), so a proportionately greater number (about three times) of teeth will be required in this form than in that of FIGS. 1-3 inclusive. It will be understood that the rear wheels of the vehicle are mounted on the extremities of the axle shafts 72 which extend through the axle tubes 74 and project beyond the tubes 74 through bearings and seals of conventional form (not shown).

The housing 110 is formed with an opening 140 in the wall of the gear chamber 112 opposite the toothed portion 138 of the differential cage 118. The area adjacent this opening may be cast and machined as a generally rectangular boss having a flat mounting surface 142. An electromagnetic pickup device 146 is provided with a corresponding rectangular mounting flange 148 which is secured to the face 142 by means of four machine screws 150. The pickup 146 is of similar construction to that of FIGS. 1-3 inclusive. The operation is essentially the same and will not be described again in detail.

Figure 6:
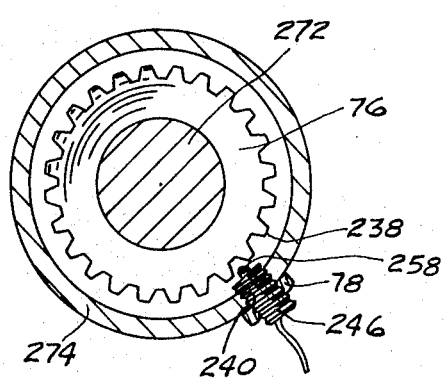
FIG. 6 is a transverse cross-sectional view of an automobile rear axle housing tube showing a third form of the invention.

Referring to FIG. 6, which shows a third form of the invention, parts having similar functions will be referred to by the same numerals plus 200. In this form of the invention, a ring or sleeve 76 is mounted on the axle shaft 272 within the axle tube 274. The axle 272 is carried in bearings as described in the preceding paragraphs. The ring or sleeve 76 is formed with teeth 238 in the manner previously described. The ring 76 is used to increase the diameter and number of teeth to provide a suitable number of impulses per mile of vehicle travel. An electromagnetic pickup 246 is adjustably secured by threaded engagement with an opening 240 in the axle tube 274. It may be locked in its adjusted position by a locknut 78. The pickup 246 differs in construction from those previously described by having only one tooth 258 which is circular and thereby permits the pickup 246 to be adjusted to a proper air gap by rotation within the threaded opening 240. Since there are no significant differences in operation, it will not be described.

Figure 7:
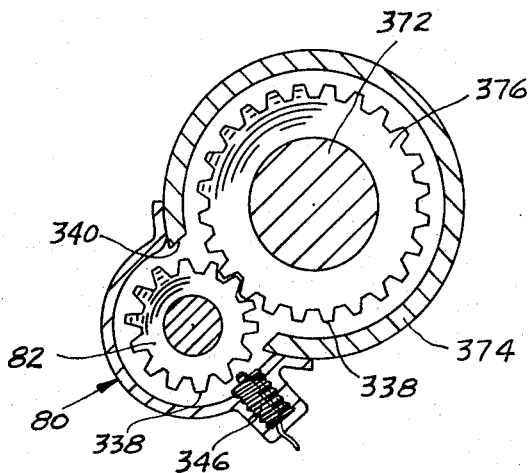
FIG. 7 is a transverse cross-sectional view of an automobile rear axle housing tube showing a fourth form of the invention.

Referring to FIG. 7, showing a fourth form of the invention, like parts are referred to by the same reference numerals plus 300. A ring 376 is secured to the axle shaft 372 within the axle tube 374. The ring 376 is formed with gear teeth 338. A sensor device 80 having rotating elements 82 and a pickup 346 is mounted in an opening 340 in the axle tube 374 so that the toothed rotating element 82 is in mesh with and driven by the gear teeth 338. The pickup 346 is affected by the teeth 338 of the toothed rotating element 82. Otherwise operation is the same as previously described and will not be repeated.

Figure 8:
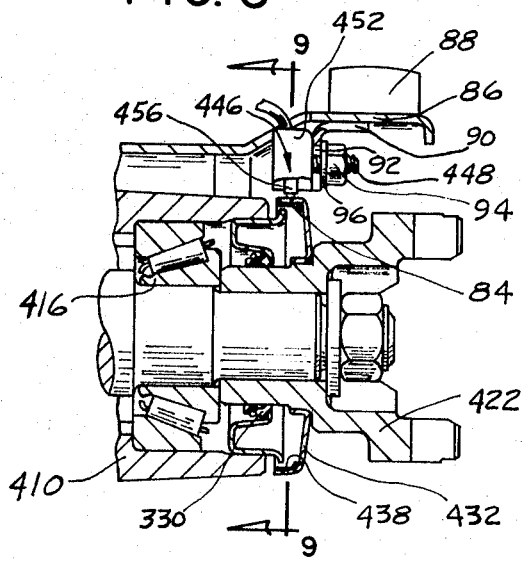
FIG. 8 is a partial sectional view in a fore-and-aft vertical plane of an automobile differential showing a fifth form of the invention.
Figure 9:
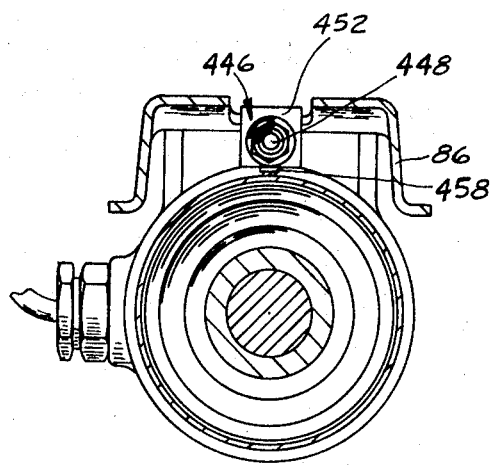
FIG. 9 is a transverse cross-sectional view on the line 9—9 of FIG. 8.

Referring now to FIGS. 8 and 9 showing a fifth form of the invention, like parts are indicated by the same numerals plus 400. In these figures there is shown a slinger 432 mounted on a universal joint yoke 422 as described in detail in relation to FIGS. 1–3 inclusive. The periphery of the slinger is notched to form teeth 438. The spaces between the teeth are filled with a molded plastic or other non-magnetic substance 84 which enables the slinger 432 to perform its required function of excluding dirt from the seal 430 and also supports the teeth and protects them from being bent or broken by the impact of stones or other objects disturbed by the passages of the vehicle.

An electromagnetic pickup 446 is mounted on a bracket 86 whose primary purpose is to support a rubber bumper 88 which limits the upward motion of the differential with relation to the vehicle frame and body (not shown). A pickup mounting bracket 90 is attached to the bracket 86 by spot welding or the like, and is formed with a slot 92. A threaded stud 448 is secured to the cup-shaped housing 452 of the pickup 446 by welding or the like. The threaded stud 448 extends through the slot 92 so that the pickup can be adjustably fixed by a nut 94 and a lock washer 96. When properly adjusted, the pickup 446 is positioned so that the teeth 458 of the core piece 456 are in suitable proximity to the teeth 438 of the slinger 432. The operation of this device is similar to those previously described and will not be described in detail.

Figure 10:
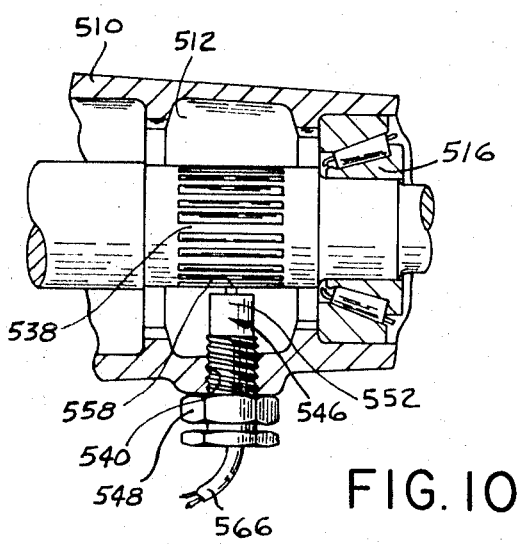
FIG. 10 is a partial sectional view in a horizontal plane of an automobile differential showing a sixth form of the invention.

FIG. 10 shows a sixth form of the invention and like parts thereon are designated by the same numerals plus 500. This embodiment is essentially similar to that of FIGS. 1-3 inclusive except that the pole piece of the pickup 546 is provided with a single round tooth 558, and a threaded housing 552 which is screwed into a threaded opening 540 in the wall of the differential housing 510 and locked by a locknut 578. This provides an alternate means by which the air gap between the teeth 558 and the teeth 538 can be established at an optimum value. Operation is identical with the forms of the invention previously described.

I claim:

1. In a motor vehicle having an engine, a pair of driven wheels, and means including a rotating shaft operably connecting the engine to the driven wheels:
   said shaft having circumferentially spaced, axially extending projections formed on the outer periphery thereof;
   a housing carried by said vehicle, said shaft being rotatably supported within said housing, said housing having an aperture extending through the wall of the housing to expose a portion of said circumferentially spaced projections;
   a member for closing said aperture, and means installing said closing member on said housing; and
   an electromagnetic probe carried by said closing member and disposed adjacent said projections when said closing member is installed on said housing, said probe including a pole piece and a coil surrounding said pole piece, said probe being responsive to movement of said projection past the pole piece to generate a signal in said coil, the frequency of said signal varying in response to the speed of rotation of said shaft.

2. In a motor vehicle having an engine, a pair of driven wheels, means operably connecting the engine with the driven wheels including a drive shaft, a pair of axle shafts connected to each of said driven wheels, and a differential operably connecting said drive shaft with each of said axle shafts:
   said differential including a housing carried by said vehicle and receiving one end of each of said shafts, mechanism within said housing including a differential cage rotatably mounted in the latter and being operably connected to each of said shafts, said cage having axially extending, circumferentially spaced projections;
   said housing having an aperture extending through the wall of the latter to expose a portion of said projections, a member for closing said aperture, and means installing said closing member on said housing;
   an electromagnetic probe carried by said closing member and disposed adjacent said projections when said closing member is installed on said housing, said probe including a pole piece and a coil surrounding said pole piece, said probe being responsive to movement of said projections past the pole piece to generate a signal in said coil, the frequency of said signal varying in response to the speed of rotation of said shaft.

* * * * *